UNITED STATES PATENT OFFICE.

WILLIAM E. BATES, OF DENVER, COLORADO.

PLASTIC COMPOSITION AND METHOD OF MAKING SAME.

1,260,625. Specification of Letters Patent. Patented Mar. 26, 1918.

No Drawing. Application filed December 5, 1917. Serial No. 205,692.

*To all whom it may concern:*

Be it known that I, WILLIAM E. BATES, a citizen of the United States, and resident of Denver, Colorado, have invented certain new and useful Improvements in Plastic Composition and Methods of Making Same, of which the following is a specification.

It is the object of my invention to prepare a new composition of matter for use in connection with the tires of automobiles and other vehicles, for belting, shoe soles, mats and floor coverings, and any like situation where it is important to have great durability with resiliency, and further a composition which will not deteriorate when subjected to oils, acids or water, as in the case of belting, or the elements as in the case of bicycle and automobile tire coverings, shoe soles and the like.

In the preparation of my improved composition I take twenty-five pounds of rubber, twenty-five pounds of pulverized or ground asbestos, ten pounds of zinc oxid, twelve pounds of white lead, thirteen ounces of sulfur, eight ounces of litharge and six ounces of oxid of lime.

I take the rubber in its crude state and pass it repeatedly between steel rolls of unequal diameter, adding the pulverized or ground asbestos and other ingredients gradually during the rolling operation, which practically constitutes a thorough mixing of the ingredients.

The asbestos lightens and preserves the product, the zinc oxid toughens the final composition and acts as a filler; the white lead, litharge and oxid of lime act as accelerators, and the sulfur is the usual curing agent.

I have found in actual test that the composition made of the materials in substantially the proportions stated is very durable, having unusual wearing qualities; it is resilient and hence adds to the life and elasticity of the wearing surface; it is less subject to deterioration from friction and is practically unaffected by oils, and acids, when used as belting and is very slightly affected by the elements when used in connection with tires or shoes.

I am enabled by this composition to get bulk and strength with remarkable lightness.

What I claim is:

1. A plastic composition consisting of rubber, comminuted asbestos, zinc oxid, white lead, sulfur, litharge, and lime in substantially the proportions stated.

2. The method herein described of producing a plastic composition consisting in passing crude rubber repeatedly between steel rolls of unequal diameter and adding to the crude rubber as it is thus passed through the rolls comminuted asbestos, zinc oxid, white lead, sulfur, litharge, and oxid of calcium in order to thoroughly mix the same, substantially as described.

In testimony whereof I affix my signature.

WILLIAM E. BATES.